(12) United States Patent
Kitazato et al.

(10) Patent No.: US 6,490,728 B1
(45) Date of Patent: Dec. 3, 2002

(54) CHANNEL INFORMATION TRANSMITTING METHOD AND RECEIVING APPARATUS

(75) Inventors: Naohisa Kitazato, Tokyo (JP); Kiichi Ihara, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/351,650

(22) Filed: Jul. 13, 1999

(30) Foreign Application Priority Data

Jul. 16, 1998 (JP) .......................................... 10-201646

(51) Int. Cl.7 .......................... H04N 7/16; H04N 7/173; H04N 11/00; H04N 7/00
(52) U.S. Cl. ........................ 725/151; 725/131; 725/139; 348/461
(58) Field of Search .............................. 725/131, 132, 725/139, 140, 151, 152; 348/461

(56) References Cited

U.S. PATENT DOCUMENTS

| | | | |
|---|---|---|---|
| 5,418,782 A | * 5/1995 | Wasilewski | 725/139 |
| 5,600,378 A | * 2/1997 | Wasilewski | 348/461 |
| 5,943,605 A | * 8/1999 | Koepele, Jr. | 348/461 |
| 5,959,659 A | * 9/1999 | Dokic | 725/132 |
| 6,016,172 A | * 1/2000 | Huh | 348/461 |

OTHER PUBLICATIONS

MPEG systems standard—ISO/IEC 13818–Jun. 1, 1994, Section 2.4.4.*
DVB Service Information (SI), specified as ETSI ETS 300 468, European Telecommunications Standards Institute, Jan. 1997, Section 4.*

* cited by examiner

Primary Examiner—John Miller
Assistant Examiner—Scott Beliveau
(74) Attorney, Agent, or Firm—Lerner, David, Littenberg, Krumholz & Mentlik, LLP

(57) ABSTRACT

A plurality of channels can be set so as to be associated with one another and an accounting system can be changed and programs can be drawn up every channel. Only information of a PMT of a program number of a main channel is described in a PAT as an information table of a PMT of a carrier frequency. When there are subprograms concerning the main program, information of the PMT of the subprogram numbers is described in the PMT. Thus, the main channel which can be set from the PAT and the subchannels which are set into the main program and are set from the PMT of the main program can be set. The subchannel can be set after it was set into the main channel and cannot be directly set. In the other cases, the subchannels are channels similar to the main channel and the scrambling and charging can be independently set from the main channel.

9 Claims, 8 Drawing Sheets

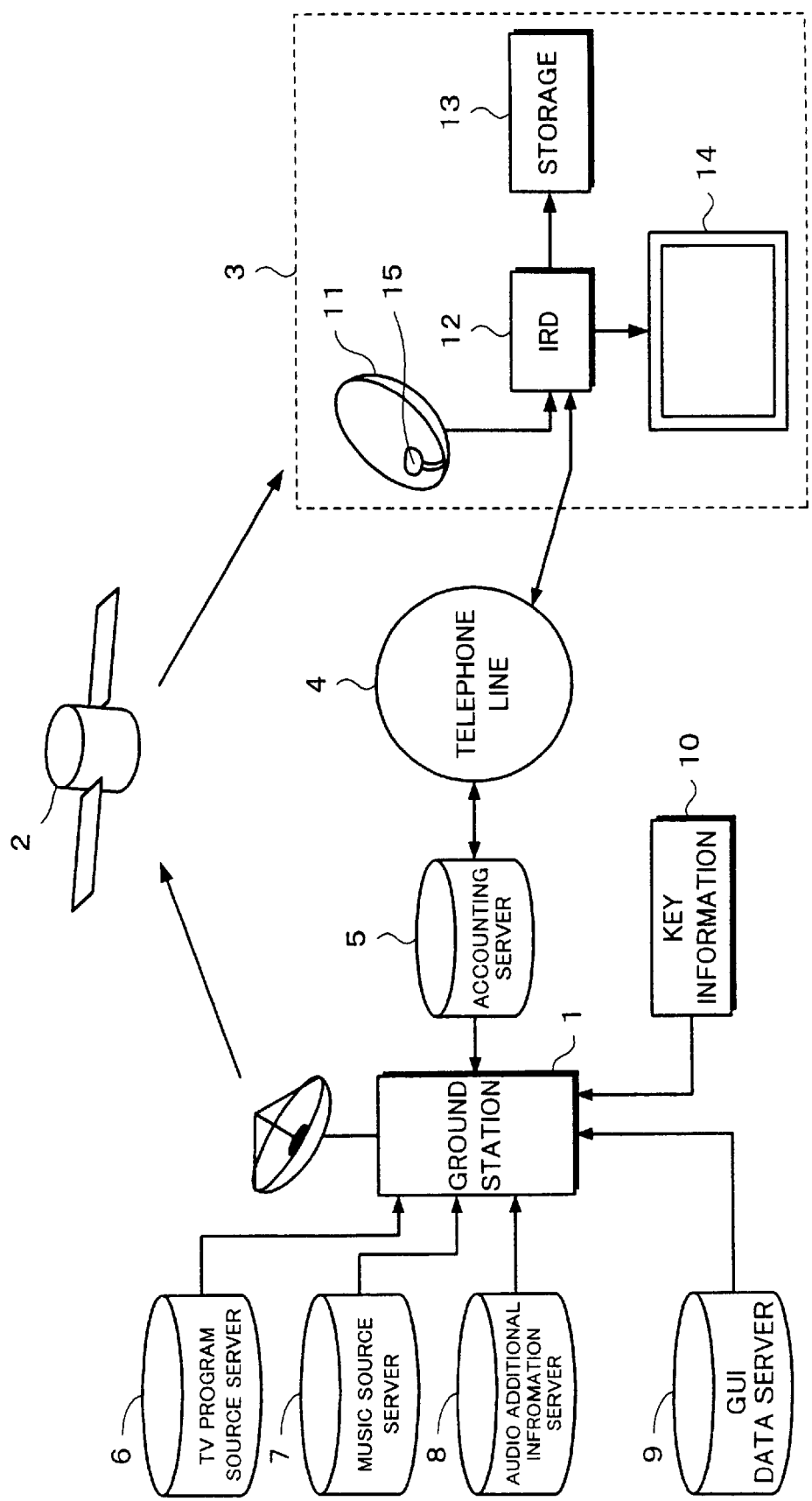

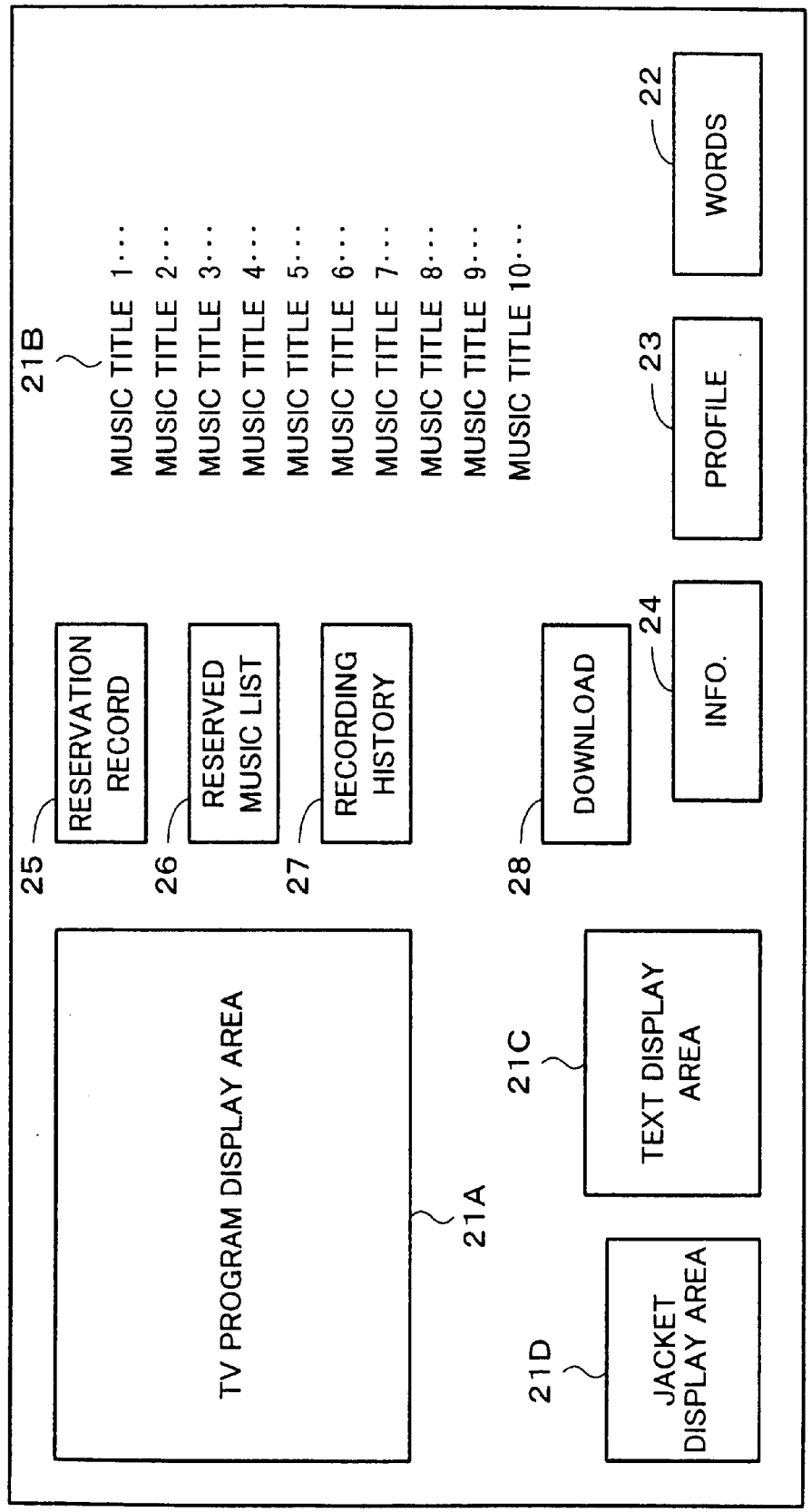

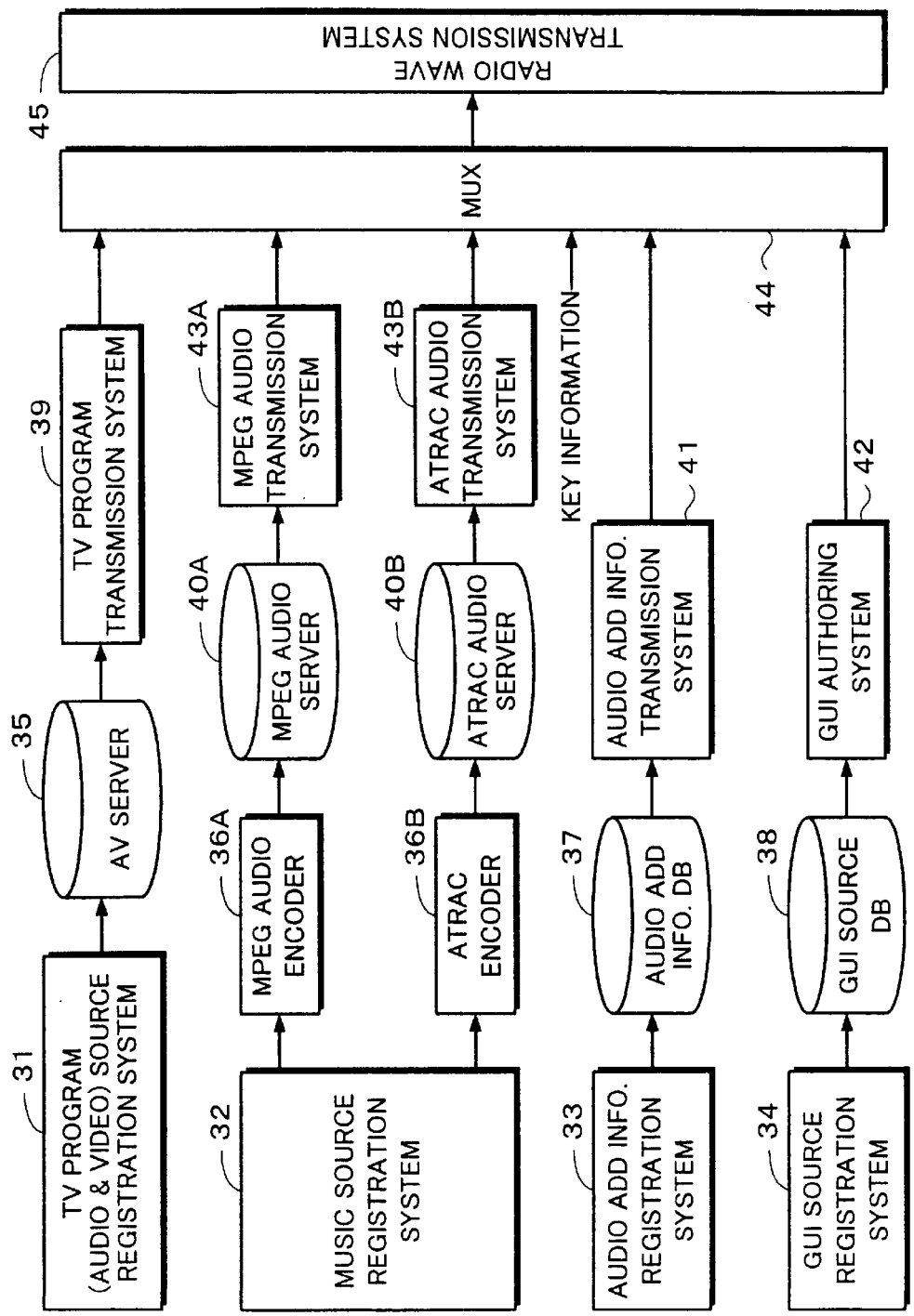

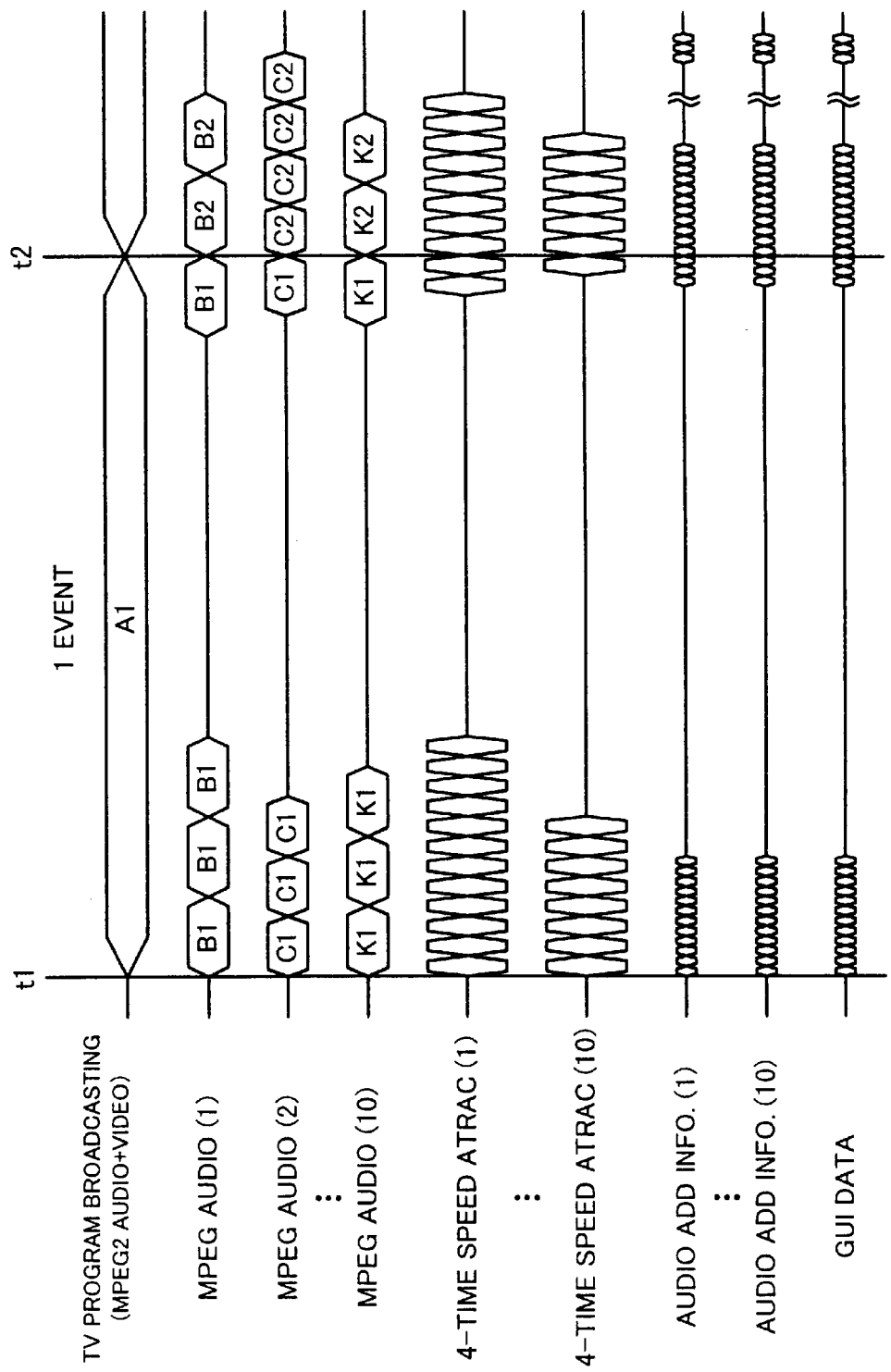

CHANNEL INFORMATION TRANSMITTING METHOD AND RECEIVING APPARATUS

BACKGROUND OF THE INVENTION

1. Field of the Invention

The invention relates to a channel setting method and a receiving apparatus which are suitable for use in a system to broadcast and distribute music by a digital satellite broadcasting.

2. Description of the Related Art

The digital satellite broadcasting is being spread. The digital satellite broadcasting is resistant to noises or fading and can transmit a signal of a high quality as compared with the existing analog broadcasting. As frequency use efficiency is improved multiple channels can be realized. For example, in the digital satellite broadcasting, hundreds of channels can be assured by one satellite. In such a digital satellite broadcasting, a number of dedicated channels for sports, movie, music, news, etc. are prepared. In the dedicated channels, a program having an exclusive-use content is broadcasted.

The music channel among the dedicated channels is one of the popular channels and a program for promotion to mainly introduce a new music piece or a hit music piece or the like is broadcast.

In the conventional music channel, as mentioned above, a program of an introduction of a new music piece or a hit music piece is sent by a motion image and an audio sound. There is a case where a viewer looks at such a music channel and if there is a favorite music piece, he wants to purchase a CD (Compact Disc) or the like of the introduced music piece and enjoy it. There is also a case where the viewer wants to know information of an artist of the music piece or information of an album in which such a music piece has been recorded. When the viewer watches a music program and if he wants to know the information of the artist of the music piece or the information of the album in which the music piece has been recorded, the information can be obtained right there. When there is a favorite music piece, if audio data of the music piece can be downloaded, it is very convenient. In the conventional music channel, however, a motion image and an audio sound regarding the music piece are unilaterally sent and such a request cannot be satisfied.

To solve the above problem, therefore, a music contents distributing system which can easily obtain information regarding music which is being broadcasted in a music channel and can easily download its music data into a data storing apparatus has been proposed.

In such a music contents distributing system, a main music program is broadcasted in one channel and data of a music piece to be downloaded is broadcasted in another channel. For example, when there is data of ten music pieces for downloading, one channel serving as a main channel and ten channels for downloading are used. In case of using the music contents distributing system, the channel of the main music program is first selected. When a music piece is designated in the main music program, the channel is switched to the channel corresponding to the designated music piece.

As mentioned above, the music contents distributing system comprises a channel of the main music program and a plurality of channels for downloading music data and it is desired that those channels are associated with each other. Since the music data is downloaded every music piece, it is desired that the accounting can be set every channel for downloading.

The channel setting of the conventional digital satellite broadcasting is performed by using PSI (Program Specific Information) including: an NIT (Network Information Table) in which information regarding a whole network has been described; a PAT (Program Association Table) in which information regarding streams of the same carrier wave has been described; and a PMT (Program Map Table) in which a PID (Packet Identifier) of a packet of a component (video/audio or the like) constructing a program of each channel number has been described. In such a conventional station selecting method, since each channel is individually independently set, a plurality of channels cannot be set in association with one another.

If a plurality of programs can be set in association with one another, it is desirable that an accounting system is changed every program or the program can be independently edited.

OBJECTS AND SUMMARY OF THE INVENTION

It is, therefore, an object of the invention to provide a channel setting method and a receiving apparatus in which a plurality of channels can be set in association with one another, an accounting system can be changed every channel, and a program can be drawn up.

According to the invention, there is provided a channel information transmitting method of a digital TV broadcasting for broadcasting a main channel comprising a video image and an audio signal and subchannels associated with the main channel, comprising the steps of: transmitting a first program map table in which information regarding a video component and an audio component of the main channel has been described; transmitting a second program map table in which information regarding components of the subchannels has been described; and describing the information of the second program map table into the first program map table and transmitting it.

According to the invention, there is provided a receiving apparatus for receiving a digital TV broadcasting for broadcasting a main channel comprising a video image and an audio signal and subchannels associated with the main channel, comprising: first extracting means for extracting a first program map table in which information regarding a video component and an audio component of the main channel included in the digital TV broadcasting signal has been described; obtaining means for obtaining information of a second program map table described in the extracted first program map table; and second extracting means for extracting the second program map table in which information regarding components of the subchannels included in a digital TV broadcasting signal has been described on the basis of the obtained information of the second program map table.

According to the invention, only information of the PMT of a program number of the main channel is described in the PAT as an information table of the PMT of a set carrier frequency. When there are subchannels associated with the main program, the information of the PMT of the program numbers of the subchannels is described in the PMT. Thus, the main channel which can be set from the PAT and the subchannels which are set from the PMT of the main channel can be set.

Since the main channel and the subchannels are set by using the PMTs of a similar format, there is no need to modify the existing system. The subchannels are channels similar to the main channel and can be independently set in each channel with respect to the scrambling and charging.

The above and other objects and features of the present invention will become apparent from the following detailed description and the appended claims with reference to the accompanying drawings.

BRIEF DESCRIPTION OF THE DRAWINGS

FIG. 1 is a block diagram showing a whole construction of an example of a music contents distributing system to which the invention is applied;

FIG. 2 is a diagram showing an example of a picture plane which is displayed in a television receiver in the system shown in FIG. 1;

FIG. 3 is a block diagram showing an example of a construction on the transmission side in the system shown in FIG. 1;

FIG. 4 is a diagram showing a structure of an example of data which is transmitted in the system shown in FIG. 1;

DETAILED DESCRIPTION OF THE PREFERRED EMBODIMENT

Figure 5A:
FIGS. 5A to 5D are explanatory diagrams showing connecting relations between an IRD and a storage device in the system shown in FIG. 1.

An embodiment of the invention will now be described hereinbelow with reference to the drawings. A system to which the invention is applied broadcasts a music program by using a digital satellite broadcasting and distributes audio data associated with the music program, thereby enabling a viewer to listen to the music program and, further when there is a favorite music piece as a result of the listening, such a music piece can be easily purchased right there.

FIG. 1 shows a whole construction of a music contents distributing system to which the invention is applied. As shown in the diagram, a source of a television program broadcasting from a television (TV) program source server 6, a source of music data from a music source server 7, audio additional information from an audio additional information server 8, and GUI (Graphical User Interface) data from a GUI data server 9 are sent to a ground station 1 of a digital satellite broadcasting.

The TV program source server 6 is a server to provide a source of an ordinary music broadcasting program. The source of the music broadcasting which is sent from the TV program source server 6 is a motion image and an audio signal. In the ordinary music broadcasting program, for example, a motion image and an audio signal for promotion to introduce a new music piece are broadcasted or a countdown of a latest hit music piece is broadcasted.

The music source server 7 is a server to provide an audio program by using an audio channel. A source of the audio program is only an audio signal. The music source server 7 sends the sources of the audio programs of a plurality of audio channels to the ground station 1. In the program broadcasting of each audio channel, the same music piece is repetitively broadcasted for a predetermined unit time. Each audio channel is independent and various methods are considered as a method of using the audio channel. For example, it is possible to construct in a manner such that a recommended music piece among latest Japanese Pop music is repetitively broadcasted for a predetermined time in one audio channel, a recommended music piece among latest U.S.A. Pop music is repetitively broadcasted for a predetermined time in another audio channel, and a recommended jazz music piece is repetitively broadcasted for a predetermined time in further another audio channel. A plurality of music pieces of the same artist can be divided into a plurality of audio channels and repetitively broadcasted.

The audio additional information server 8 provides audio additional information of the music piece which is outputted from the music source server 7. A playing time of the music piece and a music piece playing elapsed time thereof are included in the audio additional information.

The GUI data server 9 provides data to form a picture plane of a list page of music pieces to be distributed or an information page of each music piece, data to form still image data of a jacket, data to form a picture plane for EPG (Electric Program Guide), and the like. As will be explained in detail hereinlater, in the system to which the invention is applied, words of the music piece to be distributed, concert information of the artist, or the like can be displayed on the screen by the operation of the GUI on the screen. A selection, downloading, a reservation, or the like of a music piece can be performed by the operation of the GUI on the screen. Data for those operations is sent from the GUI data server 9. For instance, an MHEG (Multimedia and Hypermedia Information Coding Experts Group) system is used for the GUI data.

The ground station 1 multiplexes the video data and audio data serving as a source of the music program broadcasting from the TV program source server 6, the audio data serving as a source of the audio channel from the music source server 7, the audio additional information from the audio additional information server, and the GUI data from the GUI data server 9 mentioned above and transmits the multiplexed data. In this instance, the video data of the TV program broadcasting is compressed by, for example, the MPEG (Moving Picture Experts Group) 2 system and the audio data of the TV program broadcasting is compressed by the MPEG audio system. The audio data of the audio channels is compressed by two different systems such as MPEG audio system and ATRAC (Adaptive Transform Acoustic Coding) system. Those data is enciphered by using key information from a key information server 10 at the time of multiplexing.

In the digital satellite broadcasting system, as an account contraction, there are a flat system in which a predetermined fee is paid for every predetermined period and a PPV (Pay Per View) system in which a fee is paid in accordance with contents each time the contents are viewed. The main television program is charged by the flat system and the music data to be downloaded is charged by the PPV system. In the PPV system, scrambling is performed by using one event as a unit. In case of music data, the same music data is repetitively transmitted a plurality of times in one event.

The signal from the ground station 1 is received by a receiving facility 3 at each home through a satellite 2. A plurality of transponders are installed in the satellite 2. One transponder has a transmitting ability of, for instance, 30 Mbps. As a receiving facility 3 at each home, a parabolic antenna 11, an IRD 12, a storage device 13, and a television receiver 14 are prepared.

The signal transmitted through the satellite 2 is received by the parabolic antenna 11. The reception signal is converted into a predetermined frequency by an LNB (Low Noise Block Downconverter) 15 attached to the parabolic antenna 11 and supplied to the IRD 12.

The IRD 12 selects a predetermined program from the reception signal and demodulates video data and audio data. The IRD 12 also forms a list page of the distributed music pieces, an information page of each music piece, and a picture plane for EPG. An output of the IRD 12 is supplied to the television receiver 14.

The storage device 13 stores the downloaded audio data. For example, an MD (Mini Disc) recorder/player, a DAT (Digital Audio Tape) recorder/player, a DVD (Digital Video Disc) recorder/player, or the like can be used as a storage device 13. It is also possible to use a personal computer as a storage device 13 and store audio data onto a hard disk or a CD-R (CD-Recordable) disc of the personal computer.

The IRD 12 is connected to an accounting server 5 through, for example, a telephone line 4. An. IC card in which various information is stored is inserted into the IRD 12. When the audio data of the music piece is downloaded, its information is stored into the IC card. The information in the IC card is sent to the accounting server 5 via the telephone line 4. The accounting server 5 performs a proper charging process on the basis of the downloaded information and charges the viewer. By properly charging as mentioned above, the copyright of the music piece to be downloaded can be protected.

In the system to which the invention is applied as mentioned above, the ground station 1 multiplexes the video data and audio data as a source of the music program broadcasting from the TV program source server 6, the audio data as a source of the audio channel from the music source server 7, the audio additional information data from the audio additional information server 8, and the GUI data from the GUI data server 9 and transmits the multiplexed data. When the broadcasting is received by the receiving facility 3 at each home, the music program can be monitored and a GUI picture plane is displayed on the basis of the transmitted GUI data. When a necessary operation is performed while watching the GUI picture plane, the information page of each music piece can be seen. Each music piece can be listened to. Further, by performing the necessary operation while looking at the GUI picture plane, audio data of a desired music piece can be downloaded and stored into the storage device 13.

The operation of the viewer in the receiving facility 3 will be further explained in detail. When the broadcasting is received by the receiving facility 3 at each home, a picture plane as shown in FIG. 2 is displayed in the TV receiver 14. A motion image based on the music program presented from the TV program source server 6 is displayed in a television program display area 21A in the upper left portion of the picture plane. A list 21B of music pieces of the respective channels which are broadcasted in the audio channels is displayed in the upper right portion of the picture plane. A text display area 21C and a jacket display area 21D are set in the lower left portion of the picture plane. Further, a words display button 22, a profile display button 23, an information display button 24, a reservation recording button 25, a reserved music list display button 26, a recording history display button 27, and a download button 28 are displayed on the right side of the picture plane.

The viewer searches his interested music piece while looking at the names of music pieces displayed in the list 21B. When the interested music piece is found, the cursor is set to the music piece by operating an arrow key of a remote commander and, thereafter, an enter key of the remote commander annexed to the IRD 12 is depressed. Thus, the music piece pointed by the cursor can be listened to. That is, since the same music piece is repetitively broadcasted for a predetermined unit time in each audio channel, the channel is switched to the audio channel of the music piece and the music piece can be listened to while keeping the picture plane of the TV program display area 21A. In this instance, a still image of a CD jacket of the music piece is displayed in the jacket display area 21D.

When the cursor is set to the words display button 22 in this state and the enter key is depressed (hereinafter, the operation to set the cursor to the button and depress the enter key is referred to as "the button is depressed"), the words of the music piece are displayed in the text display area 21C at a timing synchronized with the audio data. Similarly, when the profile display button 23 or information display button 24 is depressed, a profile or concert information or the like of the artist corresponding to the music piece is displayed in the text display area 21C. Thus, the viewer can know which music piece is distributed at present and know detailed information with respect to each music piece.

When the viewer wants to purchase the music piece he listened to, he depresses the download button 28. When the download button 28 is depressed, the audio data of the selected music piece is downloaded and stored into the storage device 13. Together with the audio data of the music piece, its words data, profile information of the artist, still image data of the jacket, and the like can be downloaded. Each time the music piece is downloaded, its information is stored into the IC card in the IRD 12. The information stored in the IC card is extracted to the accounting server 5, for example, once a month. Thus, the copyright of the music piece which is downloaded can be protected.

When the viewer wants to previously reserve the downloading, he depresses the reservation recording button 25. When this button is depressed, the GUI picture plane is switched and a list of music pieces which can be reserved is displayed on the whole screen. This list can display the music pieces searched on a unit basis of one hour, one week, genre, or the like. When the viewer selects the music piece for which he wants to reserve the downloading from the list, its information is registered into the IRD 12. When he wants to confirm the music pieces for which the downloading has already been reserved, by depressing the reserved music list display button 26, those music pieces can be displayed on the whole screen. The music pieces reserved as mentioned above are downloaded by the IRD 12 when the reserved time comes and stored into the storage device 13.

When the viewer wants to confirm the downloaded music pieces, by depressing the recording history display button 27, a list of music pieces which have already been downloaded can be displayed on the whole screen.

In the receiving facility 3 of the system to which the invention is applied, as mentioned above, the list of music pieces is displayed on the GUI picture plane of the television receiver 14. By selecting the music piece in accordance with the display on the GUI picture plane, the music piece can be listened to. The words of the music piece, the profile of the artist, and the like can be known. Further, the downloading and reservation of the music pieces, the display of the history of the downloading and the list of reserved music pieces, and the like can be performed.

As described above, in the music contents distributing system to which the invention is applied, the music broadcasting program is distributed, and the audio data of the music pieces is distributed by using a plurality of audio channels. A desired music piece is searched by using the list of distributed music pieces or the like, and its audio data can be easily stored in the storage device 13. Such a system will be further described in detail hereinbelow.

FIG. 3 shows a construction of the ground station 1 in the music contents distributing system to which the invention is applied. In FIG. 3, the source data from a television program source registration system 31 is registered into an AV server 35. The source data is video data and audio data. The data registered in the AV server 35 is sent to a television program transmission system 39, by which the video data is compressed by, for example, the MPEG2 system and packetized. The audio data is compressed by, for example, the MPEG audio system and packetized. An output of the TV program transmission system 39 is sent to a multiplexer 44.

Audio data from a music source registration system 32 is supplied to an MPEG audio encoder 36A and an ATRAC encoder 36B and encoded, respectively. After that, the encoded data is registered into an MPEG audio server 40A and an ATRAC audio server 40B, respectively.

The MPEG audio data registered in the MPEG audio server 40A is sent to an MPEG audio transmission system 43A, packetized there and, after that, sent to the multiplexer 44. The ATRAC data registered in the ATRAC audio server 40B is sent as a 4-times speed ATRAC data to an ATRAC audio transmission system 43B, packetized there and, after that, sent to the multiplexer 44.

Further, audio additional information from an audio additional information registration system 33 is registered into an audio additional information database 37. The audio additional information registered in the audio additional information database 37 is sent to an audio additional information transmission system 41, packetized there and, after that, sent to the multiplexer 44.

The GUI data from a GUI source registration system 34 is registered into a GUI source database 38. The GUI source data registered in the GUI source database 38 is sent to a GUI authoring system 42, by which data of a picture plane for GUI is processed, packetized and, after that, sent to the multiplexer 44. The still image information of the jacket, the words information of the music pieces, concert information of the artist, and the like are included in the GUI source data. The still image information is converted into image data of (640×480) pixels compressed by, for example, the JPEG (Joint Photographic Experts Group) system and packetized. The words information is set to text data within, for example, 800 characters or less and packetized.

In the multiplexer 44, the video packets and audio packets from the TV program transmission system 39, the audio packet from the MPEG audio transmission system 43A, the 4-times speed audio packet from the ATRAC audio transmission system 43B, the audio additional information packet from the audio additional information transmission system 41, and the GUI data packet from the GUI authoring system 42 are time-base multiplexed, and the multiplexed data is enciphered by using the key information from the key information server 10 (FIG. 1).

An output of the multiplexer 44 is sent to a radio wave transmission system 45, by which processes such as addition of an error correction code, modulation, frequency conversion, and the like are performed. After that, the processed signal is transmitted from an antenna toward the satellite 2.

FIG. 4 shows an example of data which is transmitted from the ground station 1. The respective data shown in the diagram have actually been time-base multiplexed. As shown in FIG. 4, an interval between time t1 and time t2 is set to one event and an interval starting from time t2 is set to a next event. The "event" is a unit in which a lineup of music pieces is changed and it is generally set to 30 minutes or one hour. For example, it is considered to broadcast the 20th to the 11th music pieces among the top 20 latest hit music pieces by the first event and broadcast the 10th to the 1st music pieces by the subsequent event, or the like. The event is also a unit for encipherment.

As shown in FIG. 4, in the event between time t1 and time t2, a music program which is a program broadcasting of an ordinary motion image and has predetermined contents A1 is broadcasted. In the event starting from time t2, a music program having predetermined contents A2 is broadcasted. A motion image and an audio signal are broadcasted by the ordinary music program.

As for the audio channels, for example, 10 audio channels CH1 to CH10 are prepared. In this instance, in each of the audio channels CH1, CH2, CH3, . . . , and CH10, the same music piece is repetitively transmitted for an interval of one event. That is, in the event between time t1 and time t2, a music piece B1 is repetitively transmitted in the audio channel CH1 and a music piece C1 is repetitively transmitted in the audio channel CH2. In a manner similar to the above, a music piece K1 is repetitively transmitted in the audio channel CH10. In the event starting from time t2, a music piece B2 is repetitively transmitted in the audio channel CH1 and a music piece C2 is repetitively transmitted in the audio channel CH2. In a manner similar to the above, a music piece K2 is repetitively transmitted in the audio channel CH10. A silent interval (for example, four seconds) such that the music pieces can be distinguished is provided between the music pieces. This silent interval is commonly provided for the MPEG audio channels and the 4-times speed ATRAC audio channels.

That is, in FIG. 4, the same number shown in ( ) as a channel number of each of the MPEG audio channels and the 4-times speed ATRAC audio channels indicates the same music piece. The number shown in ( ) as a channel number of the audio additional information indicates the audio additional information added to the audio data having the same channel number. Further, still image data and text data which are transmitted as GUI data are also formed every channel. Those data are time-divisionally multiplexed in a transport packet of MPEG2 and the multiplexed data is transmitted. In the IRD 12, those data is reconstructed by using header information of each data packet.

The receiving facility 3 at each home will now be described. As shown in FIG. 1, as a receiving facility at each home, the parabolic antenna 11, IRD 12, storage device 13, and television receiver 14 are prepared. As shown in FIG. 5A, the IRD 12 has: an analog audio output terminal Aout; a digital audio output terminal Dout such as IEC958 to transmit audio data by an optical cable; and a digital interface terminal Dif such as IEEE1394. Therefore, as a storage device 13, any of a device having only an analog audio input terminal Ain, a device having a PCM audio input terminal Din such as IEC958, and a device having a bidirectional digital interface terminal Dif such as IEEE1394 can be connected.

Figure 5B:
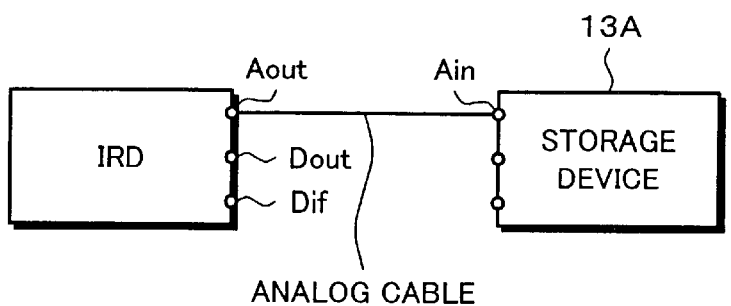
Figure 5C:
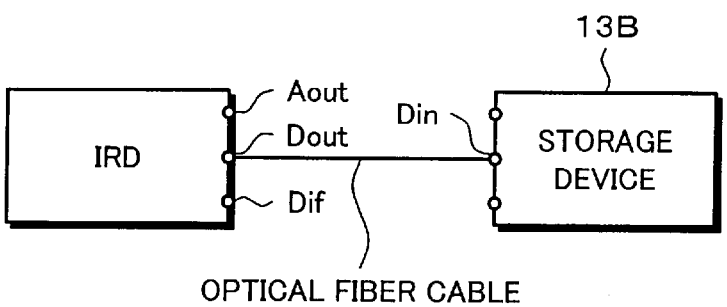

As shown in FIG. 5B, when a storage device 13A having only the analog audio input terminal Ain is used as a storage device, the analog audio output terminal Aout of the IRD 12 and the analog audio input terminal Ain of the storage device 13A are connected by an analog cable. As shown in FIG. 5C, when a storage device 13B having the PCM audio input terminal Din such as IEC958 is used as a storage device, the digital audio output terminal Dout of the IRD 12 and the digital audio input terminal Din of the storage device 13B are connected by, for example, an optical fiber such as IEC958. Further, as shown in FIG. 5D, when a storage device 13C having the bidirectional digital interface terminal Dif such as IEEE1394 is used as a storage device, the digital interface terminal Dif of the IRD 12 and the digital interface terminal Dif of the storage device 13C are connected by a digital interface cable.

As shown in FIG. 5B, when a device having no digital input terminal is used as a storage device, the downloaded MPEG audio data is subjected to an MPEG2 decoding process in the IRD 12, further D/A converted, and outputted from the analog audio output terminal Aout. The analog audio data is sent from the IRD 12 to the storage device 13A via the analog cable. In this case, by transmitting and receiving a control signal between the IRD 12 and storage device 13A by using a wireless communication by infrared rays or the like or a wired communication by a cable, the connecting relation and the downloading operation can be confirmed.

As shown in FIG. 5C, when the storage device 13B having the PCM audio input terminal Din is used as a storage device, the downloaded MPEG audio data is subjected to an MPEG decoding process in the IRD 12 and the decoded data is generated as PCM audio data from the IRD 12. The PCM audio data is sent from the IRD 12 to the storage device 13B through, for example, an optical cable such as IEC958. In this case as well, by transmitting and receiving a control signal between the IRD 12 and storage device 13A by using a wireless communication by infrared rays or the like or a wired communication by a cable, the connecting relation and the downloading operation can be confirmed.

Figure 5D:
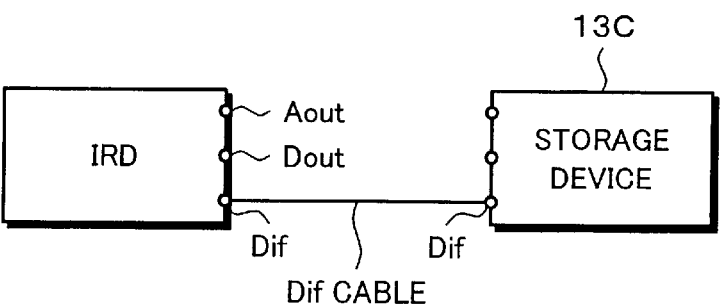

As a specific example of the case shown in FIG. 5D, when an MD recorder/player having the bidirectional digital interface terminal Dif such as IEEE1394 is used as a storage device, the downloaded 4-times speed ATRAC data is transmitted as it is from the IRD 12 to the storage device via, for example, the digital interface cable such as IEEE1394.

As mentioned above, as a device which is used as a storage device 13, three kinds of devices such as device of the analog input type, device which inputs the PCM audio data, and device which inputs the ATRAC data are considered.

Figure 6:
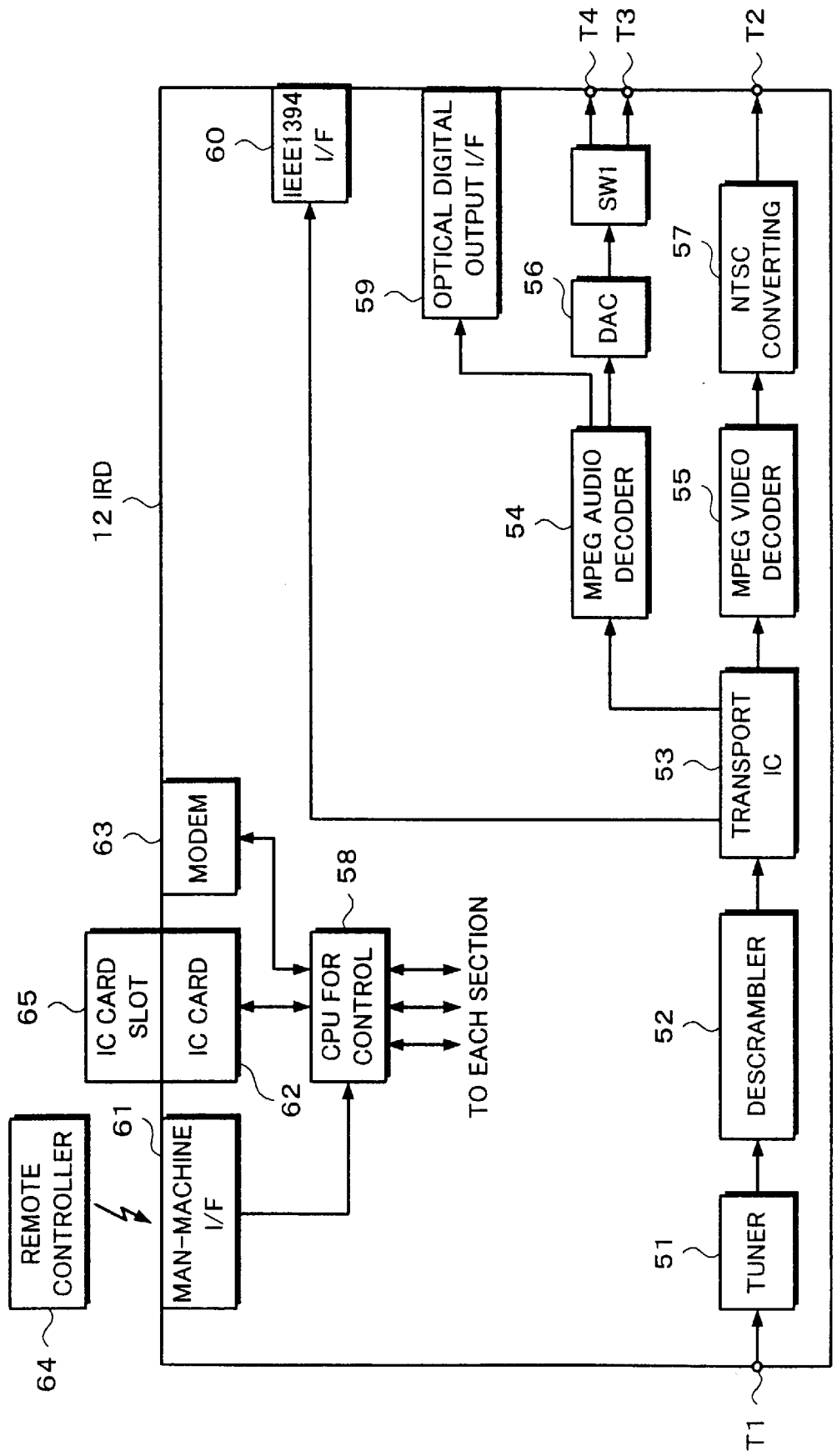
FIG. 6 is a block diagram showing an example of a construction of the IRD in the system shown in FIG. 1.

FIG. 6 shows an example of a construction of the IRD 12. As external terminals or interfaces, the IRD 12 has an input terminal T1, an analog video output terminal T2, analog audio output terminals T3 and T4, an optical digital output interface 59, an IEEE1394 interface 60, a man-machine interface 61, an IC card slot 62, and a modem 63.

A reception signal inputted to the input terminal T1 is supplied to a tuner 51. In the tuner 51, a signal of a predetermined carrier frequency is selected from the reception signal on the basis of a setting signal from a control CPU (Central Processing Unit) 58. The selected reception signal is QPSK (Quadrature Phase Shift Keying) demodulated and further subjected to an error correcting process, so that an MPEG transport stream is generated.

An output of the tuner 51 is supplied to a descrambler 52. Received ECM (Entitlement Control Message) data and EMM (Entitlement Management Message) data are inputted to the descrambler 52. Key data for descrambling stored in an IC card 65 is also inputted to the descrambler 52 through the IC card slot 62 and control CPU 58. The descrambler 52 descrambles the MPEG transport stream by using the received ECM data and EMM data and the key data in the IC card 65. The descrambled MPEG transport stream is sent to a transport IC 53.

The transport IC 53 separates a desired packet from the stream from the descrambler 52 on the basis of a command from the CPU 58. A packet identifier (PID) is provided in a header portion of each transmission packet. A desired packet is extracted on the basis of the PID and sent to an MPEG audio decoder 54 and an MPEG video decoder 55.

Packets of the video signal are sent to the MPEG video decoder 55. Packets of the audio signal are sent to the MPEG audio decoder 54.

The MPEG video decoder 55 receives the packets of the video signal from the transport IC 53 and performs a decoding process of the MPEG2 system, thereby forming video data before data compression. The video data is supplied to an NTSC converting circuit 57. In the NTSC converting circuit 57, the video data decoded by the MPEG video decoder 55 is converted into a composite video signal and further converted into an analog signal. An output of the NTSC converting circuit 57 is sent from the analog video output terminal T2 to the TV receiver 14.

The MPEG audio decoder 54 receives the packets of the audio signal from the transport IC 53 and performs an audio decoding process of the MPEG system, thereby forming audio data before data compression. The decoded audio data is converted into an analog audio signal by a D/A converter 56 and, thereafter, outputted from the analog audio output terminal T3 to the TV receiver 14. The audio data decoded by the audio decoder 54 is sent to the optical digital output interface 59.

The carrier frequency of the reception signal is set on the basis of a channel setting signal inputted from a remote controller 64 by the viewer. When a desired channel (main channel) is set, a receiving frequency of the tuner 51 is set to a predetermined carrier frequency by referring to the NIT (Network Information Table). A packet of the PMT (Program Map Table) as information regarding the desired channel is extracted with reference to a packet of the PAT (Program Association Table) as information regarding the channel at the carrier frequency. By referring to the PMT, the PIDs of the packets of the video image, audio signal, and additional data of the desired channel are obtained.

Further, if there are subchannels associated with the desired channel, the PMT of the subchannels can be described in the PMT. For example, programs for downloading concerned with the main video image and audio signal are transmitted by the subchannels. When the PMT of the subchannels has been described, the packet of the PMT of the subchannels is extracted. By referring to the PMT of the subchannels, the PID of the packet of the data of the desired subchannel is obtained.

The still image of a jacket or the like of the CD and the GUI data of the information of the words and artist and the like are sent on the basis of the MHEG5 system. As for monomedia such as still image, audio signal, or the like, contents of MHEG5 are formed together with a script showing a displaying procedure (file information, link information, time information, event) or the like. The formed contents are transmitted in a format of DSM-CC (Digital Storage Media—Command and Control).

When a music piece is selected from the list 21B of music pieces on the screen shown in FIG. 2 and the audio data of the music piece is listened to, the audio data of the selected music piece is extracted in the transport IC 53, decoded by the MPEG audio decoder 54, and digital/analog converted by the D/A converter 56. After that, the converted analog signal passes through a switch SW1 and is outputted from the analog audio output terminal T3 to the TV receiver 14.

In this instance, when the viewer performs the foregoing various operations by using the remote controller 64, control signals are transmitted from the man-machine interface 61 to the control CPU 58. The control CPU 58 processes the GUI data in accordance with the operation of the viewer.

For example, when the words display button 22 is depressed, the text data of the words sent as additional data is supplied to the MPEG video decoder 55. The text data is converted into image data by using an OSD (On Screen Display) function, converted into a composite video signal by the NTSC converting circuit 57, and outputted from the analog video output terminal T2 to the TV receiver. Thus, an acoustic sound of the music piece is generated from the speaker of the TV receiver 14 and, at the same time, the words are displayed in the text display area 21C on the picture plane synchronously with the acoustic sound.

When the download button 28 is depressed on the screen shown in FIG. 2 and the audio data of the music piece is downloaded, the channel is set to the subchannel corresponding to the download button 28. The PID to extract the PMT of the designated subchannel is obtained with reference to the PMT of the main channel. The PIDs of the audio data compressed by the MPEG system, the audio data compressed by the ATRAC system, and the additional data which are transmitted by the subchannels are obtained from the PMT of the subchannels.

With reference to the PID of the subchannel, the audio data compressed by the MPEG system, the audio data compressed by the ATRAC system, and the additional data are extracted from the transport IC 53.

When the storage device corresponding to IEEE1394 is connected to the IEEE1394 interface 60, the 4-times speed ATRAC data is selected in the transport IC 53 and is transmitted as it is to the storage device via the IEEE1394 interface 60.

When the device corresponding to IEC958 is connected to the optical digital output interface 59, the MPEG audio data is selected in the transport IC 53 and decoded by the MPEG audio decoder 54. After that, the decoded audio data is sent to the storage device through the optical digital output interface 59. When the storage device is connected to the analog audio output terminal T4, the MPEG audio data is selected, decoded by the MPEG audio decoder 54, further converted into an analog signal by the D/A converter 56, and after that, the analog signal is transmitted into the storage device.

In the system to which the invention is applied as mentioned above, the subchannels can be set into the main channel. The ordinary program or the main program is broadcasted by the main channel. For example, the music piece is downloaded by using the subchannel. The subchannel can be realized by describing the PID of the PMT of the subchannel into the PMT of the main channel.

Figure 7:
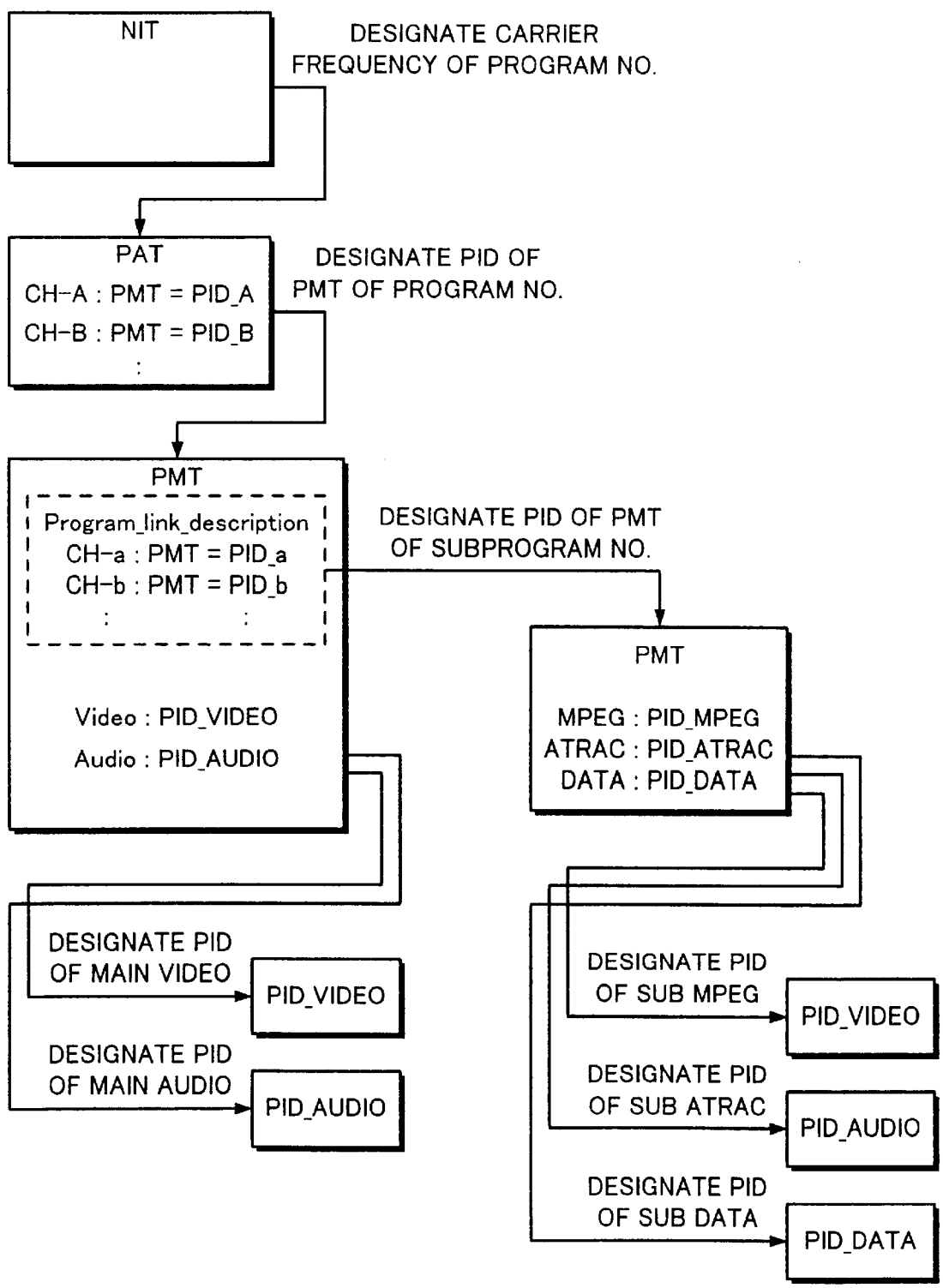
FIG. 7 is a schematic diagram for use in explanation of subchannels having a layer structure.

That is, as shown in FIG. 7, when a desired channel is selected, the NIT is first referred to. By referring to the NIT, the carrier frequency by which the program having a predetermined program number is sent can be known.

The receiving frequency of the tuner 51 is set to a predetermined carrier frequency on the basis of the information of the NIT. The packet of the PAT as information regarding the program number at the carrier frequency is referred to. By referring to the PAT, the PID of the PMT of the desired program number can be known.

The packet of the PMT is extracted on the basis of the PID. The respective components (PIDs of the packets of the video image, audio signal, and additional data) of the program number have been described in the PMT extracted as mentioned above. By extracting the packets of the PIDs based on the information, the video data and audio data of the main channel can be extracted.

When there are subchannels, the PID of the PMT of the program numbers of the subchannels has been described as a program link description in the main PMT. When the PMT of the program numbers of the subchannels is described, by extracting the packet of the PID of the PMT of the program number, the PMT of the program numbers of the subchannels is obtained. The respective components (PIDs of the packets of the video image, audio signal, and additional data) of the subchannels have been described in the PMT. By extracting the packets of the PIDs based on the information, the video data and audio data of the subchannels are obtained.

Figure 8:
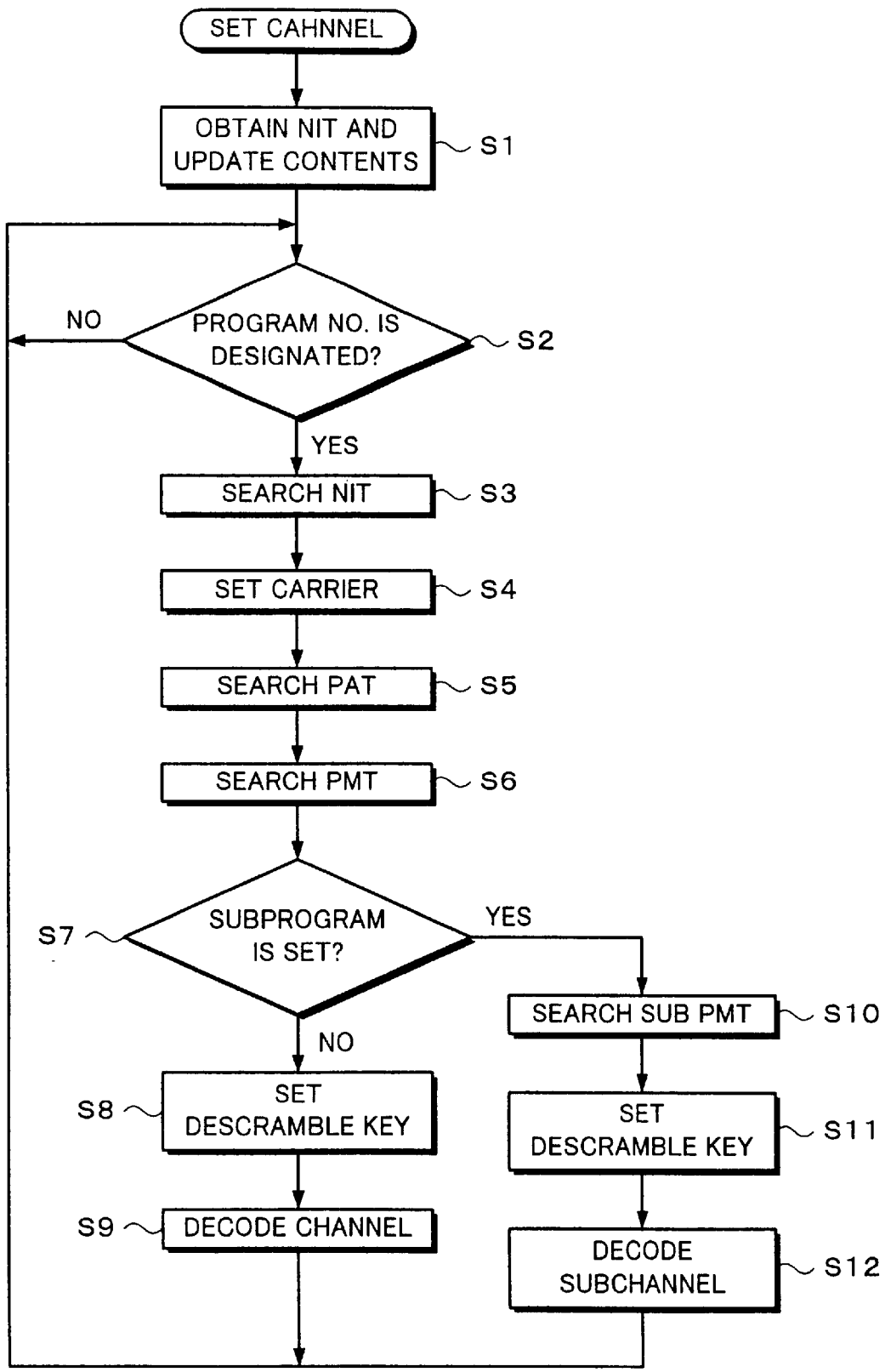
FIG. 8 is a flowchart for use in explanation of the channel setting of the layer structure.

FIG. 8 is a flowchart showing the operation at that time. In FIG. 8, the information of the NIT is obtained and the contents of the NIT in a memory (not shown) in the transport IC 53 are updated (step S1).

When the main program number is designated by the user (step S2), the carrier frequency of the broadcasting wave including the designated program number and the information of the transmission specifications of the broadcasting wave are searched on the basis of the information of the NIT (step S3).

When the carrier frequency of the broadcasting wave of the designated program number is searched, the receiving frequency is set to the carrier frequency of the broadcasting wave and the transmission specifications are set on the basis of the information (step S4).

The information of the PAT at the carrier frequency is subsequently received. The information of the PID of the packet of the PMT of the designated program number is searched from the information of the PAT (step S5).

When the PID of the packet of the PMT of the designated program number is searched, the packet of the PMT is obtained on the basis of the PID (step S6).

The PID of the packet of the components (video, audio, etc.) constructing the program of the designated program number and the PID of the packet of the ECM necessary for descrambling have been described in the packet of the PMT. Further, when there are subchannels, the packet ID of the PMT of the program numbers of the subchannels has been described as a program link description.

Whether the program number of the subchannel has been set or not is discriminated (step S7). When the program number of the subchannel is not set, the video packets and audio packets are distributed by the transport IC 53 in correspondence to the PID described in the PMT. A descramble key is set into the descrambler on the basis of the information of the PMT (step S8).

The video packet and audio packet are obtained on the basis of the PID described in the PMT, the video packet and audio packet are supplied to the MPEG audio decoder 54 and MPEG video decoder 55, and a decoding process of the video image and audio signal of the designated program number is performed (step S9).

When the program number of the subchannel is set in step S7, the PID of the packet of the PMT of the designated subprogram number is searched. The packet of the PMT of the subchannel is obtained on the basis of the PID (step S10).

The PID of the packet of the components (video, audio, additional data, etc.) constructing the subchannel and the PID of the packet of the ECM necessary for descrambling have been described in the packet of the PMT. The video packets, audio packets, and additional data packets constructing the subchannel are distributed by the transport IC 53 in correspondence to the PID described in the PMT. A descramble key is set into the descrambler on the basis of the information of the PMT (step S11).

The video packets and audio packets of the subchannels are obtained on the basis of the PID described in the PMT and a decoding process of the video image and audio signal of the subchannel is performed from the video packets and audio packets (step S12). In the foregoing music contents distributing system, only the audio data for downloading is transmitted as a subchannel. In another service, however, the audio data and video data can be transmitted as a subchannel. In the case where the main channel has already been selected and the GUI is displayed to download the music piece and the subchannel is selected, since the main channel has already been selected, there is no need to perform the processes in FIG. 8 from the beginning. It is sufficient to perform the processes in steps S10 to S12.

In the above example, although what is called a layer structure of one layer such that subchannels are set under the main channel has been used, it is also possible to use a multilayer structure such that other subchannels are further set under the subchannels.

According to the invention, only the information of the PMT of the program number of the main channel is described in the PAT as an information table of the PMT of the set carrier frequency and, when there are subchannels regarding the main program, the information of the PMT of the program numbers of the subchannels is described in the PMT. Thus, the main channel which can be set from the PAT and the subchannels which are set from the PMT of the main channel can be set.

Since the main channel and the subchannels are set by using the PMT of a similar format, there is no need to modify the existing system. The subchannels are channels similar to the main channel and the scrambling and charging can be independently set in each channel.

The present invention is not limited to the foregoing embodiment but many modifications and variations are possible within the spirit and scope of the appended claims of the invention.

What is claimed is:

1. A method of transmitting channel information of a digital TV broadcast including a main channel consisting of a video image and an audio signal and subchannels related to said main channel, comprising the steps of:

transmitting a first program map table in which information regarding a video component and an audio component of said main channel has been described;

transmitting a second program map table in which information regarding components of said subchannels has been described; and describing the information in said second program map table into said first program map table and transmitting said information.

2. A method according to claim 1, further comprising the step of transmitting a program association table in which the information in said first program map table has been described.

3. A method according to claim 1, wherein the components of said subchannels include at least an audio component.

4. A method according to claim 2, wherein said first program map table and said second program map table are similarly constructed, and only the information in said first program map table is described in said program association table.

5. A receiving apparatus for receiving a digital TV broadcast including a main channel consisting of a video image and an audio signal and subchannels related to said main channel, comprising:

first extracting means for extracting a first program map table in which information regarding a video component and an audio component of said main channel which are included in said digital TV broadcast has been described;

obtaining means for obtaining information in a second program map table described in said extracted first program map table; and second extracting means for extracting said second program map table in which information regarding components of said subchannels included in said digital TV broadcast has been described on the basis of said obtained information in said second program map table.

6. An apparatus according to claim 5, further comprising third extracting means for extracting a program association table in which said information in said first program map table has been described.

7. An apparatus according to claim 5, wherein said components of said subchannels are extracted on the basis of said information described in said second program map table extracted by said second extracting means.

8. An apparatus according to claim 7, wherein said components of said subchannels include an audio component and said extracted audio component is supplied to an audio decoder.

9. An apparatus according to claim 7, wherein said first, second, and third extracting means are constructed by a single circuit block.

* * * * *